US 11,744,675 B2
Sep. 5, 2023

(12) United States Patent
Phan

(54) ELASTIC ORTHODONTIC APPLIANCES, SYSTEMS, AND METHODS FOR USE

(71) Applicant: Smylio Inc., Fremont, CA (US)

(72) Inventor: Loc Phan, Santa Clara, CA (US)

(73) Assignee: Smylio Inc., Fremont, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/148,078

(22) Filed: Jan. 13, 2021

(65) Prior Publication Data

US 2021/0153979 A1 May 27, 2021

Related U.S. Application Data

(63) Continuation of application No. 16/775,202, filed on Jan. 28, 2020, now Pat. No. 11,317,992.

(60) Provisional application No. 62/797,797, filed on Jan. 28, 2019.

(51) Int. Cl.
A61C 7/08 (2006.01)

(52) U.S. Cl.
CPC .................. A61C 7/08 (2013.01)

(58) Field of Classification Search
CPC ........ A61C 7/08; A61C 19/063; A63B 71/085
USPC .......................................... 433/6
See application file for complete search history.

(56) References Cited

U.S. PATENT DOCUMENTS

| | | | |
|---|---|---|---|
| 5,975,893 A | 11/1999 | Chishti et al. | |
| 6,390,812 B1 | 5/2002 | Chishti et al. | |
| 6,450,807 B1 | 9/2002 | Chishti et al. | |
| 6,454,565 B2 | 9/2002 | Phan et al. | |
| 7,037,108 B2 | 5/2006 | Chishti et al. | |
| 7,131,836 B1 | 11/2006 | Kesling | |
| 8,235,713 B2 | 8/2012 | Phan et al. | |
| 9,655,693 B2 | 5/2017 | Li et al. | |
| 9,872,743 B2* | 1/2018 | Kim | B29C 51/10 |
| 10,549,511 B2 | 2/2020 | Stewart | |
| 11,317,992 B2* | 5/2022 | Phan | A61C 7/08 |
| 2002/0192617 A1 | 12/2002 | Phan et al. | |
| 2006/0078688 A1 | 4/2006 | DeSimone et al. | |
| 2008/0206715 A1 | 8/2008 | Kawamoto et al. | |
| 2010/0129763 A1 | 5/2010 | Kuo | |
| 2011/0247214 A1 | 10/2011 | Huge | |

(Continued)

FOREIGN PATENT DOCUMENTS

CN 107518953 A * 12/2017
CN 108451658 B 10/2020

(Continued)

OTHER PUBLICATIONS

Ardhuin, Helene, International Search Report & Written Opinion for PCT/US/2020/015490, dated May 13, 2020.

*Primary Examiner* — Ralph A Lewis
*Assistant Examiner* — Mirayda A Aponte
(74) *Attorney, Agent, or Firm* — MT HUNT LAW; Marcus T. Hunt

(57) ABSTRACT

An orthodontic appliance is constructed from shells shaped to receive teeth. The shells can be constructed from one or more polymer materials and stacked and also varyingly affixed to one another, which can include affixing only about the edge of each shell. The orthodontic appliance can be one of a series of similar appliances for incremental orthodontic modification of teeth.

5 Claims, 4 Drawing Sheets

(56) References Cited

U.S. PATENT DOCUMENTS

| | | |
|---|---|---|
| 2015/0366637 A1 | 12/2015 | Kopelman et al. |
| 2017/0239017 A1 | 8/2017 | Kim |
| 2017/0239018 A1 | 8/2017 | Kim |
| 2018/0235731 A1 | 8/2018 | Hung |
| 2018/0333226 A1 | 11/2018 | Tsai et al. |
| 2018/0368961 A1 | 12/2018 | Shanjani et al. |
| 2019/0105881 A1 | 4/2019 | Stewart et al. |
| 2020/0015937 A1 | 1/2020 | Stewart |
| 2020/0147856 A1 | 5/2020 | Culp et al. |
| 2020/0237478 A1 | 7/2020 | Chang et al. |
| 2021/0078357 A1 | 3/2021 | Venkatasanthanam et al. |
| 2022/0234779 A1 | 7/2022 | Spohn et al. |

FOREIGN PATENT DOCUMENTS

| | | |
|---|---|---|
| CN | 106029001 B | 8/2022 |
| JP | 2018134401 A | 8/2018 |

\* cited by examiner

Detail A

ELASTIC ORTHODONTIC APPLIANCES, SYSTEMS, AND METHODS FOR USE

CROSS-REFERENCE TO RELATED APPLICATIONS

This application is a continuation of U.S. application Ser. No. 16/775,202, filed Jan. 28, 2020, which claims the benefit of U.S. Provisional Application No. 62/797,797, filed Jan. 28, 2019. The foregoing applications are incorporated by reference herein.

FIELD OF THE INVENTION

The subject matter of the present disclosure relates generally to the field of orthodontic devices. More particularly, the present disclosure relates to user removable orthodontic devices.

BACKGROUND

An objective of orthodontics is to move a patient's teeth to positions where function and/or aesthetics are optimized. Traditionally, appliances such as braces are applied to a patient's teeth by a treating practitioner and the set of braces exerts continual force on the teeth and gradually urges them toward their intended positions. Over time and with a series of clinical visits and reactive adjustments to the braces by the practitioner, the appliances to move the teeth toward their final destination.

More recently, alternatives to conventional orthodontic treatment with traditional affixed appliances (e.g., braces) have become available. For example, systems including a series of molded plastic aligners have become commercially available from Align Technology, Inc., San Jose, Calif. under the trade name Invisalign® System. The Invisalign® System is described in numerous patents and patent applications assigned to Align Technology, Inc. including, for example in U.S. Pat. Nos. 6,450,807, and 5,975,893.

The Invisalign® System typically includes designing and fabricating multiple aligners to be worn by the patient before the aligners are administered to the patient and used to reposition the teeth (e.g., at the outset of treatment). Often, designing and planning a customized treatment for a patient makes use of computer-based 3-dimensional planning/design tools. The design of the aligners relies on computer modeling of the patient's teeth in a series of planned successive tooth arrangements, and the individual aligners are designed to be worn over the teeth, such that each aligner exerts force on the teeth and elastically repositions the teeth to each of the planned tooth arrangements.

Arguably, such aligners are less noticeable than traditional braces because typically aligners are constructed from a transparent material, however, many believe that aligners are easily noticeable due to the glossy sheen of the transparent material. Like traditional braces, aligners are required to be worn nearly constantly (20-22 hours a day), with breaks allowed for eating and cleaning teeth. Only small breaks are allowed because aligners do not have enough flexibility to account for teeth drifting out of alignment, which based on physical and material characteristics of the aligner. Increasing the working tolerance to account for higher drift requires increasing the working elasticity of an aligner, i.e., the amount an aligner can stretch to mount to teeth without causing permanent deformation, but a highly elastic aligner typically will not provide enough force to move teeth required for orthodontic treatment.

Issues like these contribute to failed results or require restart of treatments because patients fail to wear the aligners according to prescribed requirements.

SUMMARY OF THE INVENTION

Embodiments of the invention relate to orthodontic appliances, systems, and methods of use as summarized in the following paragraphs. Some embodiments relate to orthodontic appliances that maximize working elasticity.

Some embodiments relate to an orthodontic appliance that can have shells shaped to receive teeth. The shells can be stacked and substantially non-affixed to one another.

Some embodiments relate to an orthodontic appliance that can have shells shaped to receive teeth. The shells can be stacked and varyingly affixed to one another.

Some embodiments relate to an orthodontic appliance that can have a plurality of shells shaped to receive teeth being mechanically engaged provide stiffness for applying force to reposition teeth and substantially non-affixed to maximize working elasticity.

Some embodiments relate to an orthodontic appliance that can have a stack of mechanically engaged shells. The stack of mechanically engaged shells can have a stiffness substantially equivalent to a single shell of the same thickness as the stack. The stack of mechanically engaged shells can have the ability to at least partially mechanically disengage to increase working elasticity.

Some embodiments relate to an orthodontic appliance that can have a first shell having cavities shaped to receive teeth. The orthodontic appliance can include a second shell than can be shaped to receive the first shell. The second shell can be stacked over the first shell. Surfaces between the first shell are second shell can be mechanically engaged but significantly non-affixed to each other.

In some embodiments, the second shell and first shell can be affixed to one another at discrete attachment locations of the first and second shells In some embodiments, the first shell can have a bottom first surface for directly engaging the teeth and a top first surface opposite the bottom first surface. The second shell can have a bottom second surface for mechanically engaging the top first surface of the first shell and a top second surface opposite the bottom second surface. The top first surface and the bottom second surface are not significantly affixed to each other.

In some embodiments, the discrete attachment locations of fixation comprise less than 1-80% of the combined surface areas of the top first surface and the bottom second surface.

In some embodiments, the first shell has a first edge between top first and bottom first surfaces, and the second shell has a second edge between top second and bottom second surfaces, wherein the discrete attachment locations are located about the first and second edges.

In some embodiments, the shells can be made of the same material.

In some embodiments, a relatively highly elastic shell can be provided between said shells.

In some embodiments, the shells can include a first shell that can have cavities shaped to receive teeth, and at least one additional shell that can be shaped to receive the first shell, wherein the at least one additional shell can be stacked over the first shell.

In some embodiments, the first shell and at least one additional shell can be affixed to one another at discrete attachment locations of the first and at least one additional shells.

In some embodiments, the first shell can have a bottom first surface for directly engaging the teeth and a top first surface opposite the bottom first surface. The at least one additional shell can have a bottom second surface for mechanically engaging the top first surface of the first shell and a top second surface opposite the bottom second surface. The top first surface and the bottom second surface can be arranged to not be significantly affixed to each other.

In some embodiments, the first shell can have a first edge between top first and bottom first surfaces, and the at least one additional shell can have a second edge between top second and bottom second surfaces. The discrete attachment locations can be located about the first and second edges.

In some embodiments, the first shell can have a bottom first surface for directly engaging the teeth and a top first surface opposite the bottom first surface and a first edge defined therebetween. The at least one additional shell can have a bottom second surface for mechanically engaging the top first surface of the first shell and a top second surface opposite the bottom second surface and a second edge defined therebetween. Some or all of the first edge and the second edge can be arranged to not contact one another.

In some embodiments, the at least one additional shell can be a second shell, and the shells can include a third shell.

In some embodiments, the shells can only consist of the first, second, and third shells.

In some embodiments, the second edge can be affixed to the top or bottom first surface.

In some embodiments, the first edge can be affixed to the bottom or top second surface.

In some embodiments, the first edge and the second edge can be separated by 0.2-2.0 mm.

In some embodiments, the at least one additional shell can be a second shell, and the shells can include a third shell having a bottom second surface for mechanically engaging the top second surface of the second shell and a top third surface opposite the bottom third surface and a third edge defined therebetween. Some or all of the first edge, second edge, and third edge can be arranged to not contact one another.

In some embodiments, the first edge, second edge, and third edge are separated by 0.2-3.0 mm.

In some embodiments, all of the shells can be constructed from a same type of material.

In some embodiments, varyingly affixed can mean having attachment locations that can be less than 1-80% of the combined surface areas of the shells.

In some embodiments, varyingly affixed can mean having attachment locations that can be less than 1-60% of the combined surface areas of the shells.

In some embodiments, varyingly affixed can mean having attachment locations that can be less than 1-40% of the combined surface areas of the shells.

In some embodiments, varyingly affixed can mean having attachment locations that can be less than 1-20% of the combined surface areas of the shells.

Some embodiments relate to a system for repositioning teeth from an initial tooth arrangement to a final tooth arrangement. The system can include a plurality orthodontic appliances shaped to receive and reposition teeth. The plurality orthodontic appliances can include at least one aspect of the orthodontic appliances described herein.

Some embodiments relate to a method for repositioning teeth from an initial tooth arrangement to a final tooth arrangement. The method can include steps of incrementally using the system.

In some embodiments, the at least one orthodontic appliance of the system can be used less than 12 hours a day.

BRIEF DESCRIPTION OF THE DRAWINGS

For a better understanding of at least certain embodiments, reference will be made to the following Detailed Description, which is to be read in conjunction with the accompanying drawings.

Figure 1:
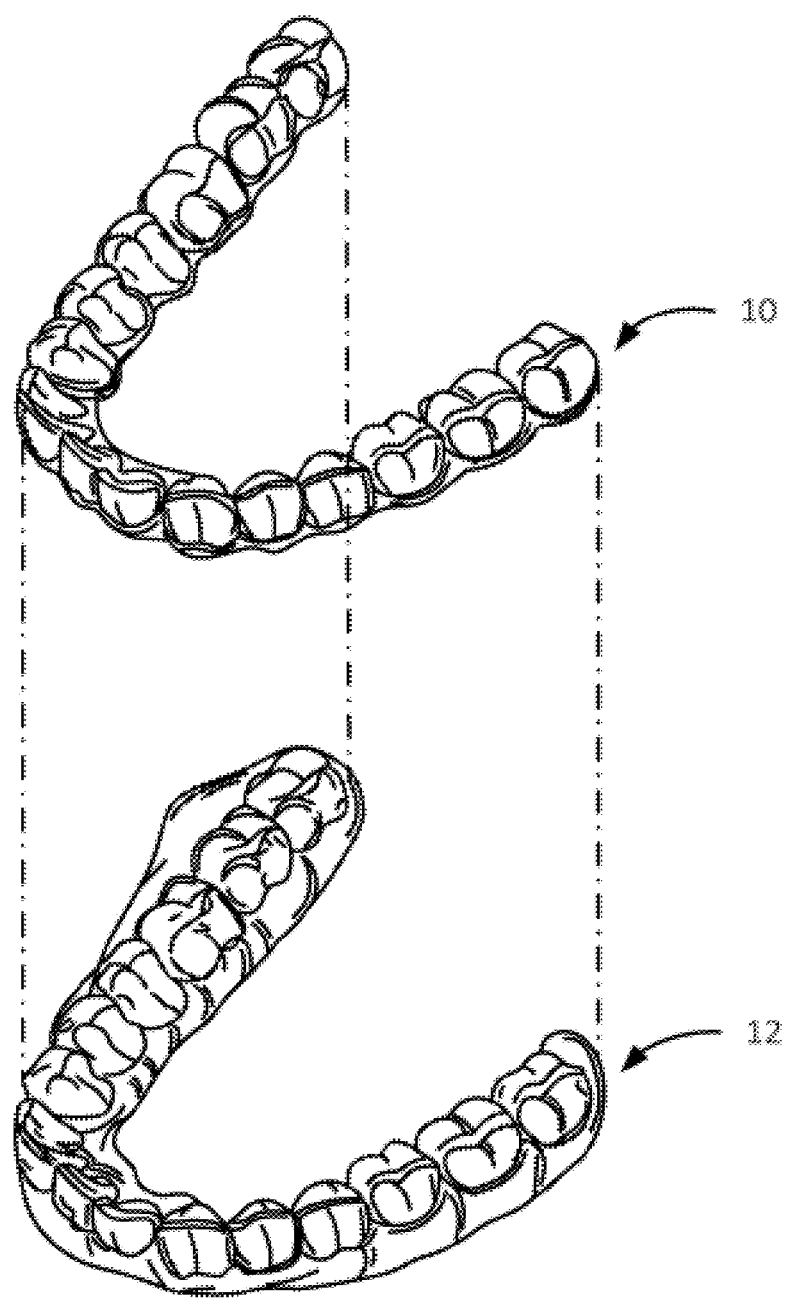
FIG. 1 is a perspective view of a jaw and an orthodontic appliance, according to some embodiments.

The figures depict various embodiments of the present invention for purposes of illustration only, wherein the figures use like reference numerals to identify like elements. One skilled in the art will readily recognize from the following discussion that alternative embodiments of the structures and methods illustrated in the figures may be employed without departing from the principles of the invention described herein.

DETAILED DESCRIPTION

Embodiments are disclosed that relate to orthodontic appliances constructed from multiple shells for the purpose of maximizing working elasticity, which is defined herein as the capability of an orthodontic appliance to elastically deform to attach to an initial location of the teeth. This flexibility can allow an orthodontic appliance to obtain a greater range of initial tooth arranging (i.e., flexing) positions that differ from the appliance's target tooth arranging (i.e., resting) position. Possible benefits include greater break time (e.g., 8-12 hours) between required wear periods and greater latitude for patient non-adherence to required wear-times, and hence increased efficacy.

Before the present invention is described in greater detail, it is to be understood that this invention is not limited to particular embodiments described, as such can, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges can independently be included in the smaller ranges and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements or use of a "negative" limitation.

As will be apparent to those of skill in the art upon reading this disclosure, each of the individual embodiments described and illustrated herein has discrete components and features which can be readily separated from or combined with the features of any of the other several embodiments without departing from the scope or spirit of the present invention. Any recited method can be carried out in the order of events recited or in any other order that is logically possible.

FIG. 1 provides an appropriate starting point in a detailed discussion of various embodiments of the present invention with respect to tooth repositioning appliances designed to apply repositioning forces to teeth. An orthodontic appliance 10 can be worn by a patient in order to achieve an incremental repositioning of individual teeth in the jaw 12. The orthodontic appliance 10 can include a shell having teeth-receiving cavities that receive and resiliently reposition the teeth. In some embodiments, a polymeric appliance can be formed from a sheet of suitable layers of polymeric material. An appliance can fit over all teeth present in an upper or lower jaw, or less than all of the teeth.

In some embodiments, only certain teeth received by an appliance will be repositioned by the appliance while other teeth can provide a base or anchor region for holding the appliance in place as it applies force against the tooth or teeth targeted for repositioning. In some cases, many or most, and even all, of the teeth will be repositioned at some point during treatment. Teeth that are moved can also serve as a base or anchor for holding the appliance as it is worn by the patient. Typically, no wires or other means will be provided for holding an appliance in place over the teeth. In some cases, however, it may be desirable or necessary to provide individual anchors on teeth with corresponding receptacles or apertures in the appliance so that the appliance can apply a selected force on the tooth. Basic methods for determining an orthodontic treatment plan using a series of incremented appliances as well as instructions for molding orthodontic appliances, are described in U.S. Pat. Nos. 6,450,807, and 5,975,893, which are incorporated by reference herein, but only to an extent that those patents do not contradict the newer teachings disclosed herein.

An appliance can be designed and/or provided as part of a set of a plurality of appliances. In such an embodiment, each appliance may be configured so a tooth-receiving cavity has a geometry corresponding to an intermediate or final tooth arrangement intended for the appliance. The patient's teeth can be progressively repositioned from an initial tooth arrangement to a target tooth arrangement by placing a series of incremental position adjustment appliances over the patient's teeth. A target tooth arrangement can be a planned final tooth arrangement selected for the patient's teeth at the end of all planned orthodontic treatment. Alternatively, a target arrangement can be one of many intermediate arrangements for the patient's teeth during the course of orthodontic treatment. As such, it is understood that a target tooth arrangement can be any planned resulting arrangement for the patient's teeth that follows one or more incremental repositioning stages. Likewise, an initial tooth arrangement can be any initial arrangement for the patient's teeth that is followed by one or more incremental repositioning stages.

The orthodontic appliances can be generated all at the same stage or in sets or batches, e.g., at the beginning of a stage of the treatment, and the patient wears each appliance until the pressure of each appliance on the teeth can no longer be felt or has resulted in the maximum amount of expressed tooth movement for that given stage. A plurality of different appliances (e.g., set) can be designed and even fabricated prior to the patient wearing any appliance of the plurality. After wearing an appliance for an appropriate period of time, the patient replaces the current appliance with the next appliance in the series until no more appliances remain. The orthodontic appliances are generally not affixed to the teeth and the patient may place and replace the appliances at any time during the procedure (e.g., patient-removable appliances).

The final orthodontic appliance or several appliances in the series may have a geometry or geometries selected to overcorrect the tooth arrangement, i.e., have a geometry which would (if fully achieved) move individual teeth beyond the tooth arrangement which has been selected as the "final." Such over-correction may be desirable in order to offset potential relapse after the repositioning method has been terminated, i.e., to permit movement of individual teeth back toward their pre-corrected positions. Over-correction may also be beneficial to speed the rate of correction, i.e., by having an appliance with a geometry that is positioned beyond a desired intermediate or final position, the individual teeth will be shifted toward the position at a greater rate. In such cases, the use of an appliance can be terminated before the teeth reach the positions defined by the appliance.

Figure 2:
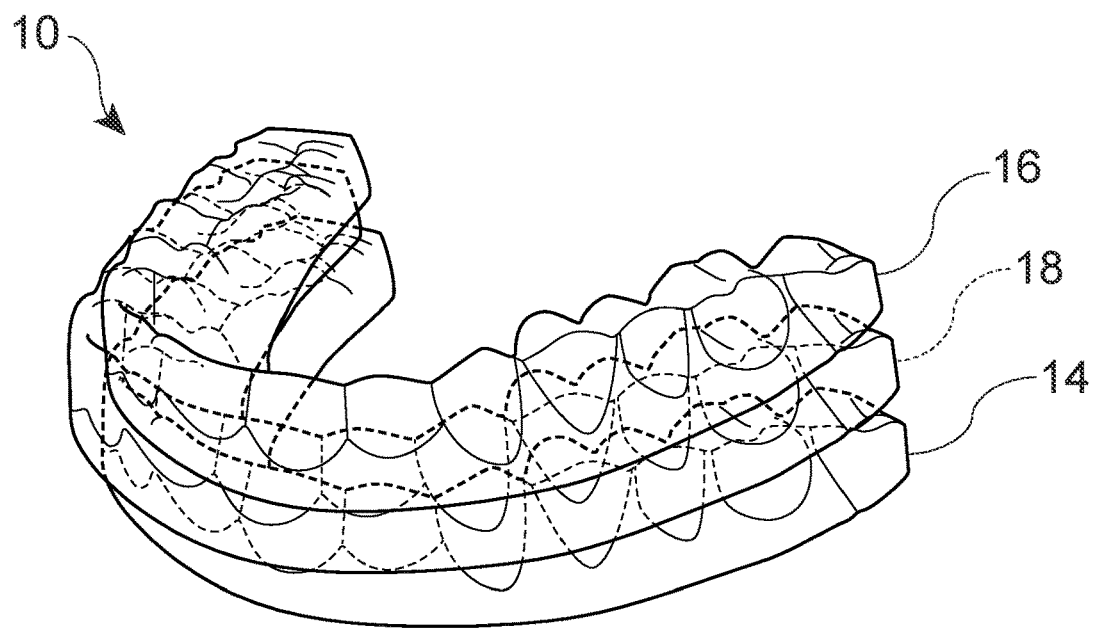
FIG. 2 is an exploded view of an orthodontic appliance, according to some embodiments.

FIG. 2 shows an exploded view of an example of the orthodontic appliance 10. The orthodontic appliance 10 can include a first shell 14 having a teeth engaging surface and an opposite upper surface. The orthodontic appliance 10 can also include a second shell 16 having a lower-shell engaging surface and an opposite upper surface that is exposed to the mouth. Optionally, one or more additional shells 18 can be located between the first shell 14 and the second shell 16. In some embodiments, the more shells that are used, the greater the working elasticity of the orthodontic appliance 10, assuming use of the same material for each shell.

While the orthodontic appliance 10 is shown in an exploded view for the purpose of better understanding, the shells of the orthodontic appliance 10 are intended to be mechanically engaged with one another in a stack. "Mechanically engaged" is defined herein as the substantially non-affixed or varyingly affixed engagement between one or more shells to approximate the strength of a single shell appliance of approximately the same thickness as the stacked shells. Mechanical engagement can be obtained by stacking the shells while having the lower-shell engaging surface of the second shell largely conforming to the upper surface of the first shell. In some embodiments, shells can be stacked loosely, i.e., without a compressive or an interference fit between shells or such that an upturned stack of shells self-disassembles, before being made substantially non-affixed or varyingly affixed. The shells are substantially non-affixed (or varyingly affixed) because a substantial amount of surface areas between the shells are not bonded or otherwise made inseparable through some process, with the remaining surfaces being affixed. In some embodiments, substantially non-affixed or varyingly affixed shells have less than 1-2%, 1-5%, 1-10%, 1-20%, 1-40%, 1-60%, or 1-80% of the combined contacting surfaces of the shells affixed. The area of non-fixation can be limited according to the needs of the appliance, hence, in some embodiments, a majority the surface areas of the appliance are affixed, while the remaining part is non-affixed because only the latter requires high working elasticity.

In some embodiments, the lack of substantial fixation between shells provides greater working elasticity to the orthodontic appliance 10 because the teeth-engaging shell can flex more due to being thinner while the outer shells are allowed to flex in multiple directions away from the teeth-engaging shell. In some embodiments, this can result in partial mechanical disengagement between some of the engaging surfaces of the shells, however the disengagement is not enough to significantly impair flexural modulus of the device required for aligning the teeth to the target position.

Figure 3A:
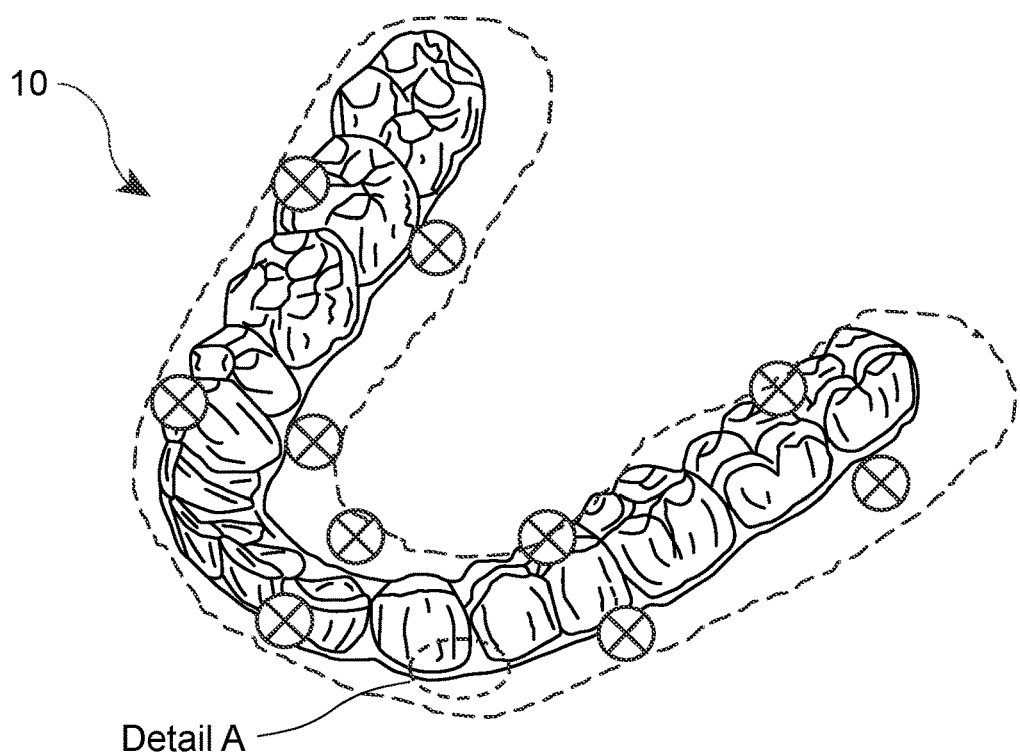
FIG. 3A is a connection schematic for an orthodontic appliance, according to some embodiments.

FIG. 3A shows a schematic for affixing the shells of the orthodontic appliance 10 at discrete locations. Each encircled "X" represents a possible point of fixation between the shells. Alternatively, as shown by the dashed line, the edges of each shell can serve as a continuous or non-continuous area of fixation. Generally, the more fixation provided, the less working elasticity the orthodontic appliance 10 will have. Points of fixation can be determined based on the amount of working elasticity required, which teeth are being moved, and which teeth are serving as anchors. Alternatively, the shells can be uniformly and weakly bonded with a highly elastic material of low cohesive strength that allows for a large amount of stretching and/or shearing. Such embodiments are substantially non-affixed or varyingly affixed because the working flexibility of such an orthodontic appliance are maintained due to the properties of the weak bond.

Figure 3B:
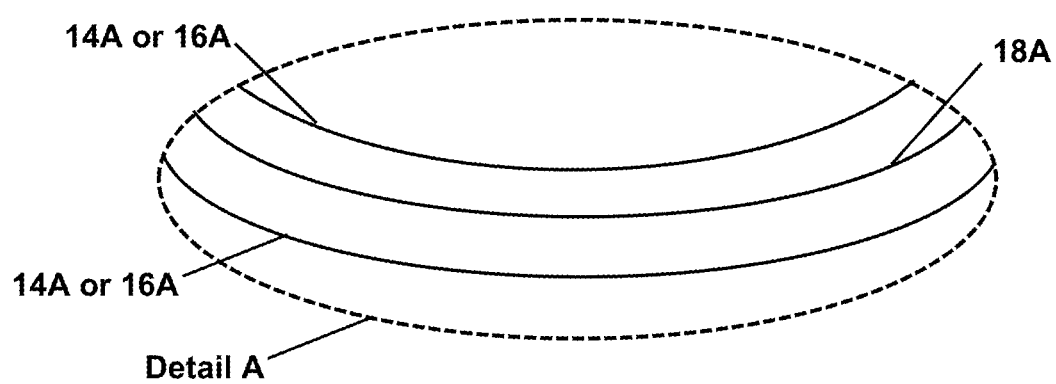
FIG. 3B is a detail view of a connection schematic for an orthodontic appliance, according to some embodiments.

In some embodiments, shells of the orthodontic appliance 10 can be non-identical such that surface areas of one shell is greater or less than another shell. Accordingly, in some embodiments, edges, which are defined by the top and bottom surfaces of each shell, of such shells can be separated by gaps (e.g. 0.20-3.0 mm), as depicted by FIG. 3B, which shows an example with three shells 14, 16, 18 and three edges 14a, 16a, 18a. In some embodiments, referring to the arrangement shown at FIG. 2, bottom-most shell 14 can have the greatest surface area, resulting in edge 14a being at the bottom most position, shown, with shells 18 and 16 respectively having smaller surfaces areas such that edge 16a is at the top-most position. In such embodiments, the shells 14, 16, 18 are stacked such that steps formed by edges 14a, 16a, 18a face outward, away from the teeth. In some embodiments, referring to the arrangement shown at FIG. 2, top-most shell 16 can have the greatest surface area, resulting in edge 16a being at the bottom most position, shown, with shells 18 and 14 respectively having smaller surfaces areas such that edge 14a is at the top-most position. In such embodiments, the shells 14, 16, 18 are stacked such that inward facing steps formed by edges 14a, 16a, 18a face inward, i.e., towards the teeth.

Providing one or more of such gaps can be used to tune flexural modulus of the orthodontic appliance 10 and also result in less tongue irritation to the patient that can occur due to material thickness where edges are bonded at the same location. To alleviate irritation, gaps can be placed in areas that face inwards towards the mouth, resulting in stepped edges (e.g., edges 14a, 16a, 18a) facing the tongue, or the tooth-engaging shell can have a smaller surface area than shells stacked thereon, resulting in interior, tooth-facing steps and a single shell edge (e.g., edge 16a) that can contact the tongue. In some embodiments, the bottom-most, tooth-engaging shell, can have a greater or lesser total surface area than a second shell stacked thereon, which can result in at least a portion of the edge of the second shell being separated from the edge of the tooth-engaging shell. In some embodiments, only portions of the edges that face towards the mouth have such a gap, and in other embodiments, a uniform or non-uniform gap can exist between the entirety of edges. In some embodiments, the orthodontic appliance 10 can include shells, each having different surface areas.

The shells can have thicknesses ranging from 0.001-0.015 inches thick, and can be constructed from a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate or a combination thereof. In some embodiments, shells are coated with lubricous materials or provided with surface treatments to decrease friction between the shells. In some embodiments, interior portions of the shells are treated with hydrophobic coatings to prevent liquid intrusion into the shells. In some embodiments, shells of relatively more flexibility can be used in conjunction with stiffer shells. Flexible shells can be constructed from hydrogels, styrenic block copolymers (SBC), silicone rubbers, elastomeric alloys, thermoplastic elastomers (TPE), thermoplastic vulcanizate (TPV) elastomers, polyurethane elastomers, block copolymer elastomers, polyolefin blend elastomers, thermoplastic co-polyester elastomers, thermoplastic polyamide elastomers, or a combination thereof. Flexible shells may also provide the benefit of a gasket to prevent liquid intrusion between the shells.

Figure 4:
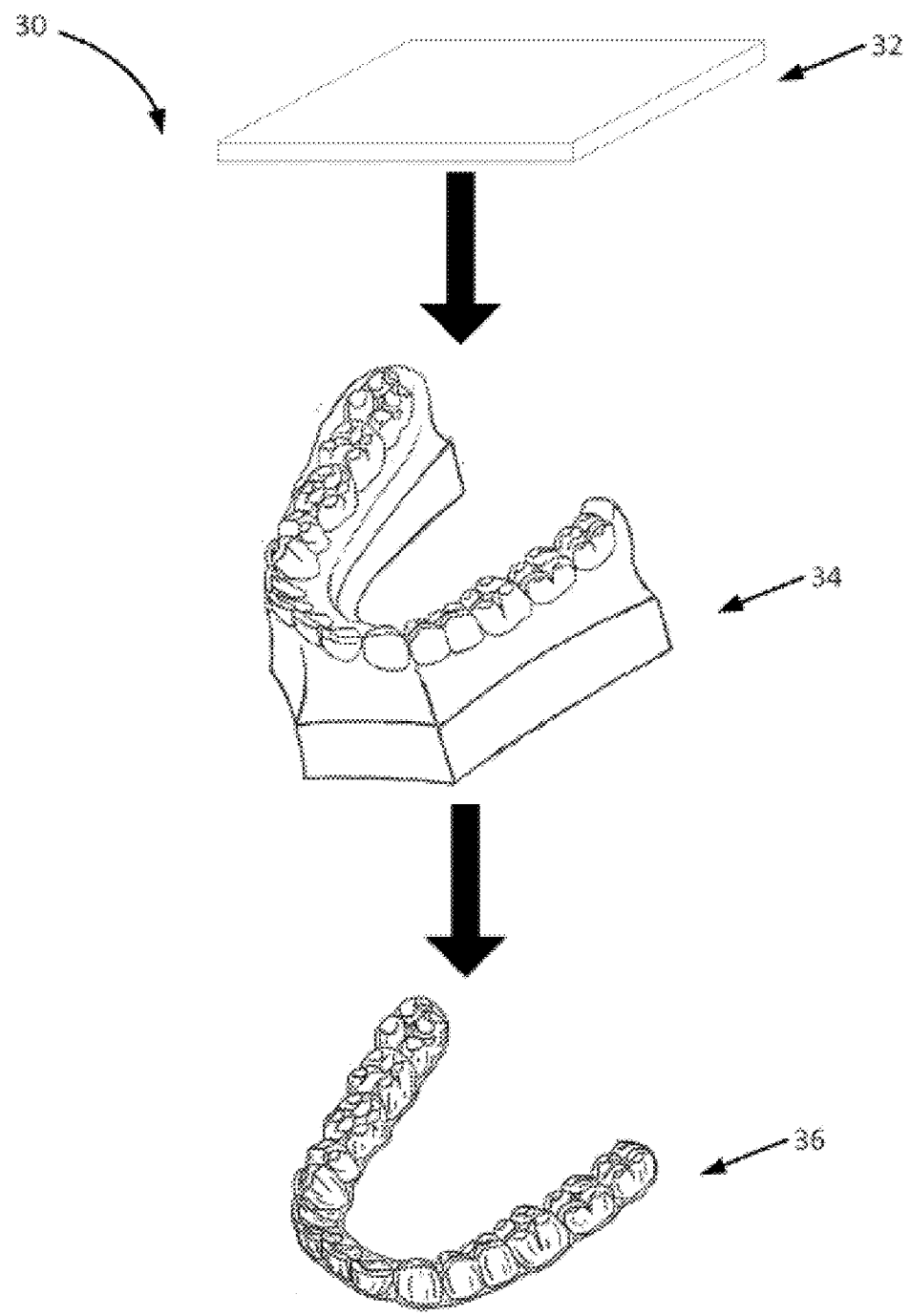
FIG. 4 is a perspective view of a process for molding an orthodontic appliance, according to some embodiments.

FIG. 4 depicts an example of a basic process 30 for forming an orthodontic appliance. As shown, a material 32 can be formed into an orthodontic appliance 36. The material 32 can be of one layer to form a single shell or multiple non-affixed layers of material to form multiple shells at once. In this example process, the tooth positioning appliance 36 can be produced with the use of a physical tooth model, or mold, 34. The tooth positioning appliance 36 can be produced by heating the thermoformable material 32 and then vacuum or pressure forming the material over the teeth in the physical tooth model 34. The tooth positioning appliance 36 is a direct representation of the physical tooth model. In some embodiments, material 32 is dimensioned (e.g., 120 mm and/or 125 mm diameter circle) for ready processing on a commercially available forming device (e.g., Erkoform®, Erkoform-3dmotion®, Biostar®, Ministar S®, Drufomat Scan®, Drufosmart®, Essix® SelectVac®). Guidelines for operating such forming devices can be found at Scheu Dental Technology, *Biostar Operating Manual*, DE/GB/FR/IT/ES/1.000/06/19 G REF PM 0113.01; Scheu Dental Technology, *Application booklet for the pressure moulding technique*, GB 2.000/07/19 G REF 0111.02; Erkodent, *Thermoforming*, S15-3106-48; Erkodent, *Erkoform 3D*, 61-8002-2; Erkodent, *Erkoform-3D+ Instructions*, BA-Erkoform-3d+-anl-EN-04-04-2019, which are incorporated by reference herein.

After formation, shells can be affixed to one another according to the desired working elasticity required for the patient. Methods of fixation include chemical bonding, localized melting, fasteners, and/or localized physical deformation to key the shells together. Before or after fixation takes place, excess material from the sheet can be trimmed to form a final tooth positioning appliance that can be used for orthodontic treatment of a patient. The edges of the shells can be sealed with a flexible material such as silicone to prevent liquid intrusion.

One or a series of physical tooth models, such as the model described above, may be used in the generation of elastic repositioning appliances for orthodontic treatment. Similar to the process above, each of the appliances can be generated by thermoforming a multilayer polymeric material over a mold of a desired tooth arrangement to form a dental appliance. The tooth positioning appliance of the desired tooth arrangement generally conforms to a patient's teeth but is slightly out of alignment with the initial tooth configuration. Placement of the elastic positioner over the teeth applies controlled forces in specific locations to gradually move the teeth into the desired configuration. Repetition of this process with successive appliances comprising new configurations eventually moves the teeth through a series of intermediate configurations to a final desired configuration.

Throughout the foregoing description, and for the purposes of explanation, numerous specific details are set forth in order to provide a thorough understanding of the described techniques. It will be apparent, however, to one skilled in the art that these techniques can be practiced without some of these specific details. Although various embodiments that incorporate these teachings have been shown and described in detail, those skilled in the art could readily devise many other varied embodiments or mechanisms to incorporate these techniques. Also, embodiments can include various operations as set forth above, fewer operations, or more operations; or operations in an order. Accordingly, the scope and spirit of the invention should be judged in terms of the claims, which follow as well as the legal equivalents thereof.

What is claimed is:

1. An orthodontic appliance comprising:
   a stack of polymer shells, the stack of polymer shells being shaped to have cavities shaped to receive teeth, the stack of polymer shells comprising non-affixed portions and affixed portions, the stack of polymer shells comprising a first shell, second shell, and third shell,
   wherein the first shell has a bottom first shell surface with the cavities shaped to receive the teeth and a top first shell surface opposite the bottom first shell surface, and a first shell edge therebetween;
   wherein the second shell is shaped to receive the first shell, wherein the second shell has a bottom second shell surface in contact with the top first shell surface and a top second shell surface opposite the bottom first shell surface, and a second shell edge therebetween;
   wherein the third shell shaped to receive the second shell, wherein the third shell has a bottom third shell surface in contact with the top second shell surface and a top third shell surface opposite the bottom third shell surface, and a third shell edge therebetween;
   wherein the affixed portions are located about the first shell edge, second shell edge, and third shell edge, wherein the first shell edge and the second shell edge are separated by a first gap of a first uniform width, and wherein the first shell edge and the third shell edge are separated by a second gap of the first uniform width or a second uniform width.

2. The orthodontic appliance of claim 1, wherein first shell, second shell, and third shell are constructed from a same type of polymer material.

3. The orthodontic appliance of claim 1, wherein the orthodontic appliance only consists of the first shell, second shell, and third shell.

4. The orthodontic appliance of claim 1, wherein the affixed portions comprise less than 20% or 40% of a combined surface area of the bottom second shell surface, top first shell surface, top second shell surface, and bottom third shell surface.

5. The orthodontic appliance of claim 1, wherein non-affixed portions are not bonded or made inseparable.

* * * * *